US012781818B2

(12) United States Patent
Altmann et al.

(10) Patent No.: US 12,781,818 B2
(45) Date of Patent: Nov. 3, 2026

(54) BRAKE LINING BACKPLATE FOR A BRAKE PAD, METHOD FOR PRODUCING SAME, AND BRAKE PAD FOR A VEHICLE DISC BRAKE

(71) Applicant: Bayerische Motoren Werke Aktiengesellschaft, Munich (DE)

(72) Inventors: Martin Altmann, Maisach (DE); Gabriele Fruhmann, Poettmes (DE); Peter Genender, Woerthsee (DE); Eduard Ginglas, Horgau-Auerbach (DE); Maximilian Koenning, Mering (DE); Markus Kohlhuber, Schweitenkirchen (DE); Philipp Saenftl, Munich (DE); Michael Staake, Munich (DE); Thomas Strubel, Glonn (DE); Baldur Tiesler, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 301 days.

(21) Appl. No.: 18/710,279

(22) PCT Filed: Nov. 10, 2022

(86) PCT No.: PCT/EP2022/081472
§ 371 (c)(1),
(2) Date: May 15, 2024

(87) PCT Pub. No.: WO2023/099150
PCT Pub. Date: Jun. 8, 2023

(65) Prior Publication Data

US 2026/0160305 A1 Jun. 11, 2026

(30) Foreign Application Priority Data

Dec. 1, 2021 (DE) .................... 10 2021 131 519.0

(51) Int. Cl.
*F16D 65/095* (2006.01)
*B33Y 80/00* (2015.01)
*B33Y 10/00* (2015.01)

(52) U.S. Cl.
CPC ............ *F16D 65/095* (2013.01); *B33Y 80/00* (2014.12); *B33Y 10/00* (2014.12); *F16D 2250/0084* (2013.01)

(58) Field of Classification Search
CPC ........... F16D 65/095; F16D 2250/0084; B33Y 10/00; B33Y 80/00
(Continued)

(56) References Cited

U.S. PATENT DOCUMENTS 6,267,206 B1 * 7/2001 Grimme .............. F16D 69/0408 188/73.1
2006/0096814 A1 * 5/2006 Hoffrichter ............... F16F 7/01 188/73.37

(Continued)

FOREIGN PATENT DOCUMENTS

DE 10 2013 006 098 A1 3/2014
DE 10 2013 111 584 A1 5/2015

(Continued)

OTHER PUBLICATIONS

International Search Report (PCT/ISA/210) issued in PCT Application No. PCT/EP2022/081472 dated Mar. 27, 2023 with English translation (7 pages).

(Continued)

*Primary Examiner* — Christopher P Schwartz
(74) *Attorney, Agent, or Firm* — Crowell & Moring LLP

(57) ABSTRACT

A brake lining backplate has a first outer wall and a second outer wall located opposite the first outer wall. An outer peripheral wall connects the two outer walls to one another, and in the brake lining backplate there is at least one
(Continued)

damping cavity which is enclosed by the two outer walls and the outer peripheral wall. In addition, the damping cavity is at least partially filled with a granular damping material. Also disclosed are a method for producing a brake lining backplate and a brake pad for a vehicle disc brake.

16 Claims, 4 Drawing Sheets

(58) Field of Classification Search
USPC .......................................... 188/250 B, 250 G
See application file for complete search history.

(56) References Cited

U.S. PATENT DOCUMENTS

| | | | | |
|---|---|---|---|---|
| 2012/0152668 | A1 * | 6/2012 | Santamaria Razo | ... F16F 7/015 264/642 |
| 2015/0107946 | A1 | 4/2015 | Karatas | |
| 2016/0195147 | A1 | 7/2016 | Carney | |

FOREIGN PATENT DOCUMENTS

| | | | | |
|---|---|---|---|---|
| DE | 10 2015 104 035 | B3 | 5/2016 | |
| DE | 102019202698 | A1 * | 9/2020 | ............. B33Y 80/00 |
| EP | 2 443 359 | B1 | 12/2014 | |
| EP | 2 881 611 | A2 | 6/2015 | |
| IT | 201800006328 | A1 | 12/2019 | |
| JP | 2013-113336 | A | 6/2013 | |
| WO | WO 00/14425 | A2 | 3/2000 | |

OTHER PUBLICATIONS

German-language Written Opinion (PCT/ISA/237) issued in PCT Application No. PCT/EP2022/081472 dated Mar. 27, 2023 with English translation (9 pages).
German-language Search Report issued in German Application No. 10 2021 131 519.0 dated Jul. 19, 2022 with partial English translation (10 pages).

* cited by examiner

BRAKE LINING BACKPLATE FOR A BRAKE PAD, METHOD FOR PRODUCING SAME, AND BRAKE PAD FOR A VEHICLE DISC BRAKE

BACKGROUND AND SUMMARY

This disclosure relates to a brake lining rear plate for a brake pad of a vehicle disk brake, with a flat (that is to say, plate-like) main body which has a first and an opposite second flat outer side, the first outer side being provided to fasten a brake lining, and the second outer side being provided to face an actuator.

Furthermore, the disclosure relates to a method for producing a brake lining rear plate of this type, and to a brake pad for a vehicle disk brake with a brake lining rear plate of this type.

It is customary in vehicles to use disk brake systems which, in addition to a brake disk, comprise a brake caliper. Here, the brake disk is connected fixedly to a vehicle wheel for conjoint rotation and in the process carries out the rotational movement of the vehicle wheel.

The brake caliper is in turn connected non-rotationally to the vehicle chassis, and surrounds the brake disk partially, brake pads which are fastened to the brake caliper being pressed onto the brake disk during a braking operation. As a result, the rotational movement of the vehicle wheel is decelerated and, at the same time, the entire vehicle is braked as a result.

It is known that a vibration excitation can take place on the brake pads during the braking operation, which vibration excitation leads to an undesired noise level. This noise level is also known popularly under the term “brake squeal”.

Various measures are proposed in the prior art, by way of which measures the vibrations can be reduced.

For example, it is customary for brake pads to be provided with absorber masses, detuning of the entire system being achieved by way of the inertia of the additional masses and their specific arrangement on the brake pad.

As an alternative or in addition, damping plates are used on the brake pad, which damping plates decouple the brake pad from the remaining part of the brake caliper, it being possible as a result for improved damping of the brake pad to be achieved. The damping plates are attached to the brake lining rear plate by way of an adhesive, the vibration movement being attenuated as a result of a shear effect in the adhesive layer.

The known measures for vibration damping and therefore for noise reduction are expensive, however, and do not always satisfy the requirements of the marketplace.

It is therefore an object of the present disclosure to improve the damping of existing brake pads, in order that the noise development during the braking operation is reduced further.

According to the disclosure, the object is achieved by way of a brake lining rear plate of the type mentioned at the outset, with a first outer wall which at least partially forms the first outer side and a second outer wall which lies opposite the first outer wall and at least partially forms the second outer side. An outer peripheral wall connects the two outer walls to one another. There is at least one damping cavity in the brake lining rear plate, which damping cavity is enclosed by the two outer walls and the outer peripheral wall. The damping cavity is, moreover, filled at least partially with a granular damping material.

The granular damping material according to the disclosure is not exclusively restricted here to a purely grainy form, but rather can also be present in a suspension in the damping cavity. In the suspension, the granular damping material is then dispersed in a fluid, that is to say a liquid or gas. In particular, this is a viscous fluid.

A principle of the disclosure lies in a conversion of energy, a part of the vibration energy being converted into thermal energy. The granular damping material is excited by the vibrations, as a result of which it is set in motion. Friction firstly arises here between the individual, freely movable particles of the granular damping material among one another. Secondly, friction arises between the granular damping material and the outer walls and between the granular damping material and the outer peripheral wall. Moreover, a further part of the vibration energy is dissipated by way of random collisions of the particles of the damping material among one another.

In accordance with one embodiment, a plurality of longitudinal webs are provided which lie inward from the outer peripheral wall. The longitudinal webs connect the outer walls to one another, and delimit the damping cavities from one another. As a result, a greater boundary surface with respect to the loose damping material arises, the boundary surface being formed by way of those walls of the brake lining rear plate which surround the damping cavity. More efficient damping is achieved by way of the increase in the boundary surface.

The longitudinal webs advantageously extend radially in the direction of a common center. Center lines of the longitudinal webs or imaginary extensions of the center lines intersect in the center. The center can serve, for example, as force application location for a brake piston, as a result of which an applied piston force can be conducted over a large area into the brake lining rear plate. This is advantageous, in particular, when the brake lining rear plate has small wall thicknesses and is weakened greatly by way of a large-volume damping cavity or by way of a plurality of damping cavities which in total have a great volume.

In addition to the radial longitudinal webs, at least one longitudinal web can be of circular configuration, the radial longitudinal webs merging into the circular longitudinal web. By way of this structural design, an introduction of a brake piston force into the brake lining rear plate can be improved, and damage of the brake lining rear plate on account of the high brake piston force to be expected can be counteracted.

In accordance with a further embodiment, at least one transverse web is provided in at least one damping cavity, which transverse web extends laterally into a damping cavity. As a result, at least two part spaces which are open toward one another are formed. The transverse webs again increase the boundary surface in the damping cavity, the boundary surface serving as friction surface, by way of which more vibration energy can be dissipated.

One refinement provides that the transverse web emanates from a longitudinal web and extends into an adjacent damping cavity. The longitudinal web is divided here by way of the transverse web into two portions which are not congruent in an imaginary extension. Center planes which can be set into in each case one of the two portions are not congruent, in particular. As a result of these asymmetrical portions, the transverse web which divides the two portions can be set in motion when opposed forces act from outside in each case on the two portions. As a result, the granular damping material is additionally excited, and the vibration damping is boosted.

In particular, the longitudinal webs and transverse webs can be designed for one or more resonant frequencies of a brake pad in such a way that the damping takes place over a broad or narrow band around the resonant frequency or the resonant frequencies. Here, in particular, the number, the shape and the position of the longitudinal and transverse webs have an influence on the damping behavior.

A plurality of damping cavities are advantageously provided which have different volumes and/or are filled with different damping material. The volumes and the different damping materials likewise have an influence on the damping behavior. For instance, the degree of filling can be increased or decreased locally by way of different volumes, the weight of the entire brake lining rear plate not necessarily being changed greatly. Different damping material which likewise results in a different damping behavior differs here, for example, in terms of the grain density, the grain size, the grain volume and the grain geometry.

In accordance with one aspect of the disclosure, with the exception of the granular damping material, the brake lining rear plate is configured in one piece and has a layered construction. In addition to the low part complexity as a result of the brake lining rear plate which is configured in one piece, the layered construction makes a high load-bearing capacity in the direction of the layer structure possible, as a result of which the transmission of a brake piston force in the direction of the layer structure is possible without problems.

According to the disclosure, furthermore, the object is achieved by way of a method for producing a brake lining rear plate according to the disclosure. The brake lining rear plate is produced by way of an additive manufacturing method, in the case of which a plurality of individual layers are built up on one another. The layer construction takes place, in particular, from the first outer side in the direction of the second outer side or vice versa. The additive manufacturing method makes an extraordinarily free design possible, as a result of which, for example, undercuts as can occur in the case of transverse webs can be produced simply. The layered construction is relevant for the abovementioned load-bearing capacity of the brake lining rear plate. In particular, a layer structure should be at right angles or approximately at right angles to a brake piston force which acts on the outside of the brake lining rear plate, since otherwise the shear forces which occur between the layers can destroy the brake lining rear plate.

It can be provided that the manufacturing method is a powder pack method, and a powder material which is required on account of the powder pack method remains loose in at least one damping cavity after the additive layer construction. As a result, manufacturing steps for introducing the powder into the damping space can be saved. Moreover, a filling opening does not have to be provided on the brake lining rear plate, which filling opening would have to be closed after the damping material is filled in. As a consequence, the powder is also applied layer by layer in the region of the damping space, but is not thermally treated there, with the result that it remains loose.

Moreover, the abovementioned object is achieved by way of a brake pad for a vehicle disk brake, with a brake lining and a brake lining rear plate according to the disclosure. Here, the brake lining is fastened non-releasably directly to the first outer side of the brake lining rear plate. Therefore, the brake pad is present as a compact, exchangeable unit, it being possible for it to be exchanged simply in the case of a greatly worn brake lining.

In accordance with one variant, a damping plate is attached to the second outer side. The damping plate has an assisting effect with respect to the above-described damping properties of the brake lining rear plate, and provides additional vibration damping.

BRIEF DESCRIPTION OF THE DRAWINGS

The disclosure will be explained in the following text on the basis of different exemplary embodiments which are shown in the appended drawings.

DETAILED DESCRIPTION OF THE DRAWINGS

Figure 1:
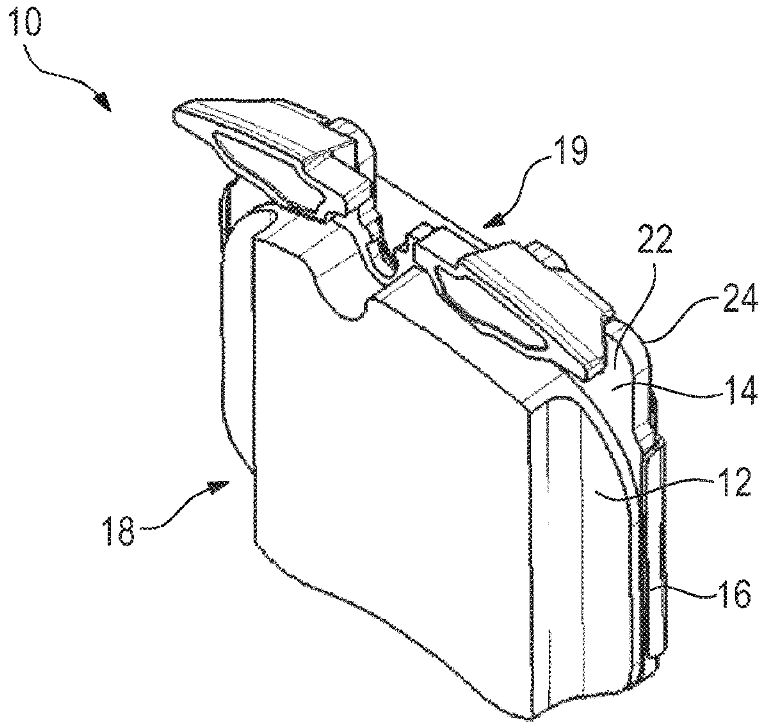
FIG. 1 shows a brake pad according to the disclosure in accordance with one embodiment in a perspective view.

FIG. 1 shows a brake pad 10 according to the disclosure of a vehicle disk brake, the brake pad 10 having a brake lining 12, a brake lining rear plate 14 according to the disclosure and a damping plate 16.

In the case of a braking operation, the brake piston of the vehicle disk brake transmits a brake force to the damping plate 16 which in turn forwards the brake force to the brake lining rear plate 14. The brake force is then transmitted via the brake lining 12 to the brake disk, as a result of which a frictional force counteracts the rotational movement of the brake disk. The brake lining 12 of the brake pad 10 is in direct contact with the brake disk here.

In order that the brake lining 12 is not carried along by the arising frictional force between the brake lining 12 and the brake disk, it is adhesively bonded non-releasably to the brake lining rear plate 14.

The damping plate 16 serves to damp vibrations which occur during the braking operation, and to reduce an associated background noise.

Moreover, the damping plate 16 produces a mechanical connection of the brake pad 10 to a brake piston of the vehicle disk brake, the brake piston being actuated by an actuator of the vehicle disk brake. The damping plate 16 therefore ensures decoupling in vibration terms of the brake piston and the brake lining rear plate 14, and is adhesively bonded to the brake lining rear plate 14 for this purpose.

The brake lining rear plate 14 serves firstly to structurally reinforce the brake lining and to impart a certain stability. Secondly, it has the function of additional vibration damping.

The brake lining rear plate 14 has a flat, that is to say plate-like main body with a first outer side 18 and an opposite second outer side 19, the brake lining 12 being arranged on the first outer side 18, and the damping plate 16 being arranged on the second outer side 19. The outer sides 18, 19 are flat, that is to say are configured without substantial projections or depressions, that is to say are substantially planar.

Furthermore, the first outer side 18 faces a brake piston and an actuator in a state of the brake lining rear plate 14, in which it is installed in the vehicle disk brake. At the same time, the second outer side 19 faces the brake disk.

Figure 2:
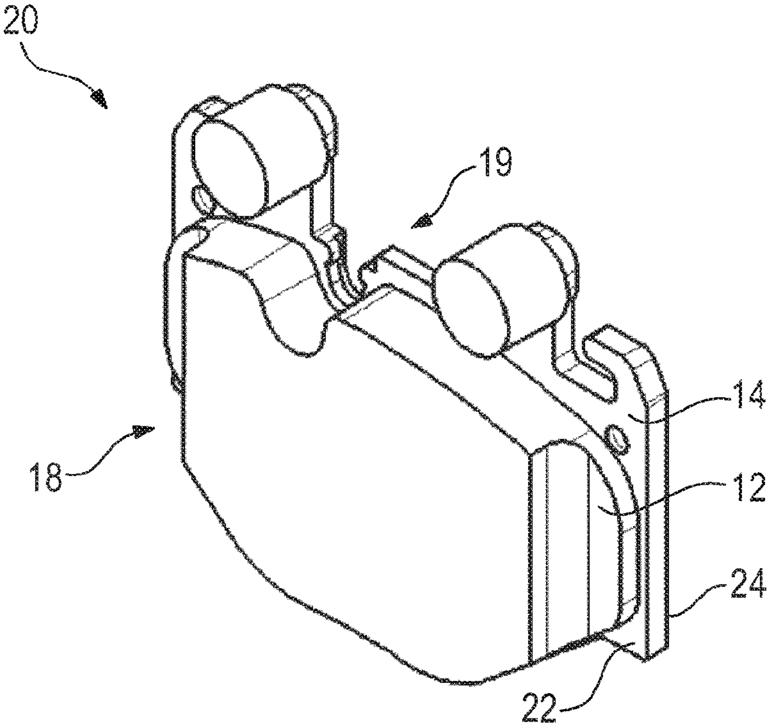
FIG. 2 shows a brake pad according to the disclosure in accordance with a further embodiment in a perspective view.

FIG. 2 shows a further brake pad 20 according to the disclosure which differs from the embodiment according to FIG. 1 in that there is no damping plate 16.

In the case of the braking operation, the brake piston in the case of this embodiment can press, for example, directly on the second outer side 19 of the brake lining rear plate 14 and not, as described above, on the damping plate 16.

Figure 3:
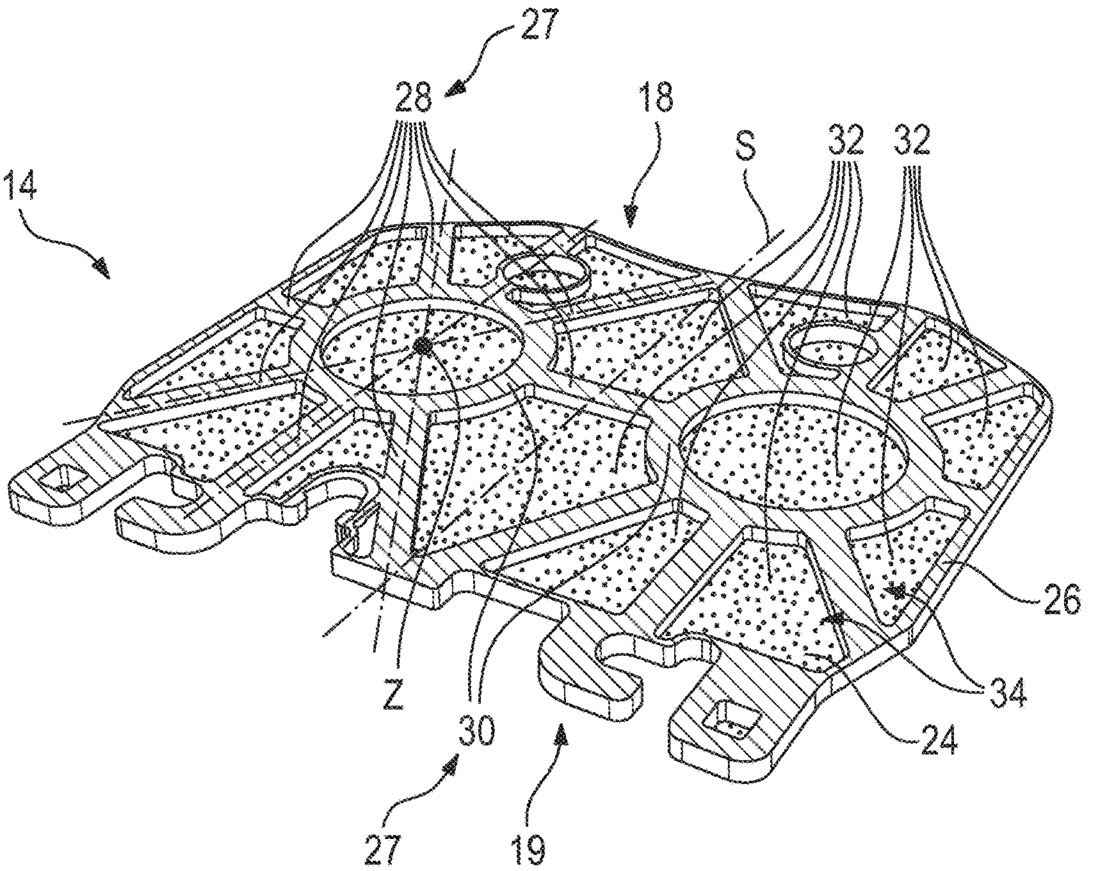
FIG. 3 shows a brake lining rear plate according to the disclosure in a perspective view, which brake lining rear plate has been produced via a method according to the disclosure, the brake lining rear plate being shown sectioned parallel to its front side.

FIG. 3 shows the brake lining rear plate 14 according to the disclosure in a sectional view. The brake lining rear plate 14 corresponds substantially to the brake lining rear plate 14 which is shown in FIGS. 1 and 2 and is a constituent part of the brake pads 10, 20 according to the disclosure. These brake lining rear plates 14 differ merely by way of smaller outer features for fastening the brake lining rear plate 14 to a brake caliper.

The brake lining rear plate 14 has a first and a second outer wall 22, 24. The first outer wall 22 cannot be seen in FIG. 3 on account of the sectional view, but can be gathered from FIGS. 1 and 2. The first and second outer wall 22, 24 are each part of the first and second outer side 18, 19, respectively, of the brake lining rear plate 14.

An outer peripheral wall 26 connects the first and second outer wall 22, 24 to one another, the outer peripheral wall 26 running at the edges of the first and second outer wall 22, 24 (see FIG. 3).

In addition, there are a plurality of longitudinal webs 27 which comprise a plurality of rectilinear longitudinal webs 28 and two circular longitudinal webs 30, all the longitudinal webs 27 extending within the outer peripheral wall 26. As a consequence of the longitudinal webs 27 and the outer peripheral wall 26, a plurality of closed damping cavities 32 are formed. Here, the longitudinal webs 27 separate the plurality of damping cavities 32 from one another, while the outer peripheral wall 26 delimits the damping cavities 32, which adjoin the outer peripheral wall 26, from the surroundings of the brake lining rear plate 14.

The two outer walls 22, 24 likewise delimit all the damping cavities 32 with respect to the surroundings, the delimitation taking place in the direction of the first and second outer side 18, 19.

In the embodiment which is shown according to FIG. 3, the rectilinear longitudinal webs 28 merge in a seamless and single-piece manner into the circular longitudinal webs 30. Since the two circular longitudinal webs 30 with the adjoining rectilinear longitudinal webs 28 are configured symmetrically about the mirror axis S, complete labeling of the longitudinal webs 27 and the damping cavities 32 has been dispensed with in FIG. 3 for the sake of clarity.

Each of the two circular longitudinal webs 30 has a center Z. Imaginary extensions of the rectilinear longitudinal webs 28 intersect in this center Z. In other words, the rectilinear longitudinal webs 28 extend radially in the direction of the common center Z. For this purpose, the center lines of the rectilinear longitudinal webs 28 are marked for illustrative purposes in FIG. 3.

Each of the two circular longitudinal webs 30 serves to introduce the brake force of a brake piston into the brake lining rear plate 14, the radially running rectilinear longitudinal webs 28 being provided for the homogeneous distribution of force via the brake lining rear plate 14.

It is fundamentally conceivable that the longitudinal webs 27 have any desired shape, that is to say they do not necessarily have to be rectilinear or circular. In particular, they might also be elliptical or have an asymmetrical shape, which shapes are additionally conducive for the damping properties.

The damping cavities 32 are filled at least partially with a granular damping material 34 which lies loosely in the damping cavities 32.

As a result of the vibrations which are introduced into the brake pad 10, 20, the damping material 34 in the brake lining rear plate 14 also experiences a vibration excitation. Furthermore, an inner friction between the freely movable particles of the damping material 34 occurs.

In addition, friction arises between the damping material 34 and a plurality of boundary surfaces of the brake lining rear plate 14, the boundary surface being formed by way of the surrounding walls of a damping cavity 32. In the present case, the surrounding walls comprise the first and second outer wall 22, 24, the outer peripheral wall 26 and the longitudinal webs 27.

The vibration energy is dissipated partially by way of the described frictional effects, as a result of which the brake noise is reduced. Moreover, a further part of the vibration energy is dissipated by way of random collisions of the particles of the damping material 34 among one another.

A particularly satisfactory damping behavior is achieved on account of the plurality of damping cavities 32, since the sum of the boundary surface of all the damping cavities 32 is relatively great.

As can be seen from FIG. 3, the damping cavities 32 have different volumes, moreover. As a result, the degree of filling in the damping cavities 32 can be increased or decreased locally, the weight of the entire brake lining rear plate 14 not necessarily changing greatly. This can be achieved, for example, by way of a local compression of the damping material 34 in one of the damping cavities 32.

Moreover, in the present exemplary embodiment, the damping cavities 32 are filled with the same damping material 34.

It is also conceivable, however, that the damping cavities 32 are filled with different damping material 34. The damping material 34 in the different damping cavities 32 can differ here in terms of the grain weight, the grain density, the grain size and/or the grain geometry, this influencing the damping properties of the entire brake lining rear plate 14.

In the present embodiment, moreover, the brake lining rear plate 14 is configured in one piece, with the exception of the damping material 34.

The damping material 34 is preferably, however, the granulate for producing the brake lining rear plate 14.

Figure 4:
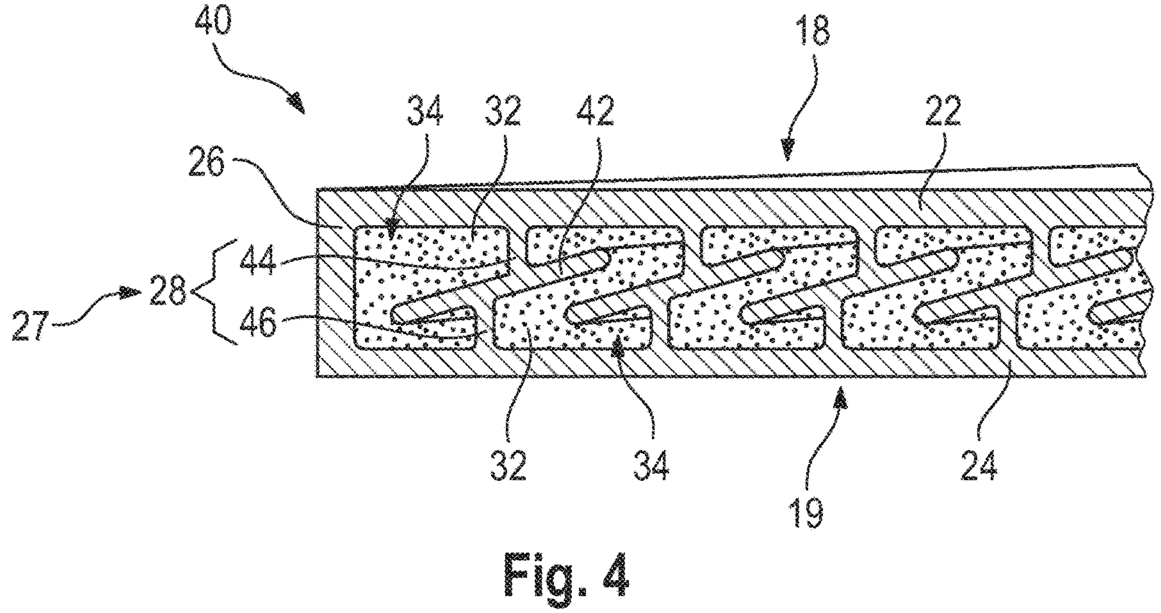
FIG. 4 shows a brake lining rear plate according to the disclosure in a sectional view in accordance with a further embodiment in a perspective view, which brake lining rear plate has been produced via a method according to the disclosure.

FIG. 4 shows an edge detail of a further brake lining rear plate 40 according to the disclosure. In contrast to the above-described brake lining rear plate 14 according to FIG. 3, this brake lining rear plate has transverse webs 42 which each extend laterally into two adjacent damping cavities 32 and end freely there. As a result, two part spaces which are open toward one another are formed in one damping cavity 32.

The boundary surface to the damping material 34 is increased by way of the transverse webs 42, as a result of which the vibration damping is in turn improved.

In this embodiment, the longitudinal webs 27 are a plurality of parallel rectilinear longitudinal webs 28.

It would of course also be conceivable, however, that the longitudinal webs 27 have any desired shape, some longitudinal webs 27 being configured, in particular, as circular longitudinal webs 30 as in the embodiment according to FIG. 3.

The longitudinal webs 27 merge seamlessly into the transverse webs 42, the longitudinal webs 27 being divided by way of in each case one transverse web 42 into a first and a second portion 44, 46.

Moreover, the two portions 44, 46 are not congruent in their imaginary extension. This means that the center planes of each portion 44, 46 are not congruent with respect to one another.

In other words, the two portions 44, 46 are therefore asymmetrical with respect to one another.

In the case of an introduction of force into the first outer wall 22 by way of an actuator and an introduction of a reaction force on the second outer wall 24 which, as is known, faces the brake lining 12, the transverse web 42 therefore experiences a rotational movement in the elastic region of the brake lining rear plate 40, which rotational movement excites the damping material 34.

Here, the rotational movement is brought about by way of respectively opposed normal forces in the portions 44, 46; the lines of action of the two normal forces must not be collinear for this purpose.

Figure 7:
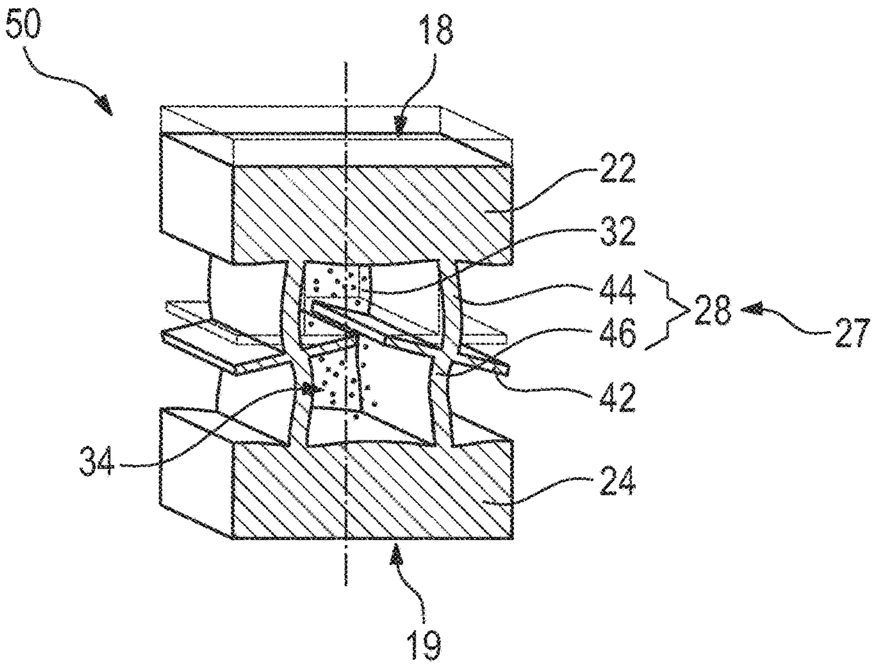

This functional principle will be explained again in greater detail in the following text. FIG. 7 shows a part detail of a brake lining rear plate 50 in accordance with a further embodiment with two longitudinal webs 27, a transverse web 42 extending laterally away in each case from each longitudinal web 27.

The brake lining rear plate 50 can be seen in a somewhat compressed state in FIG. 7, as is to be expected, for example, during a braking operation. In comparison with an uncompressed state, the transverse webs 42 are now twisted somewhat, as a result of which an additional movement of the damping material 34 can be achieved. As a result of the additional movement, the number of random collisions of the damping material 34 is increased, as a result of which the vibrations which are introduced as a consequence of a braking operation are decreased further.

Figure 5:
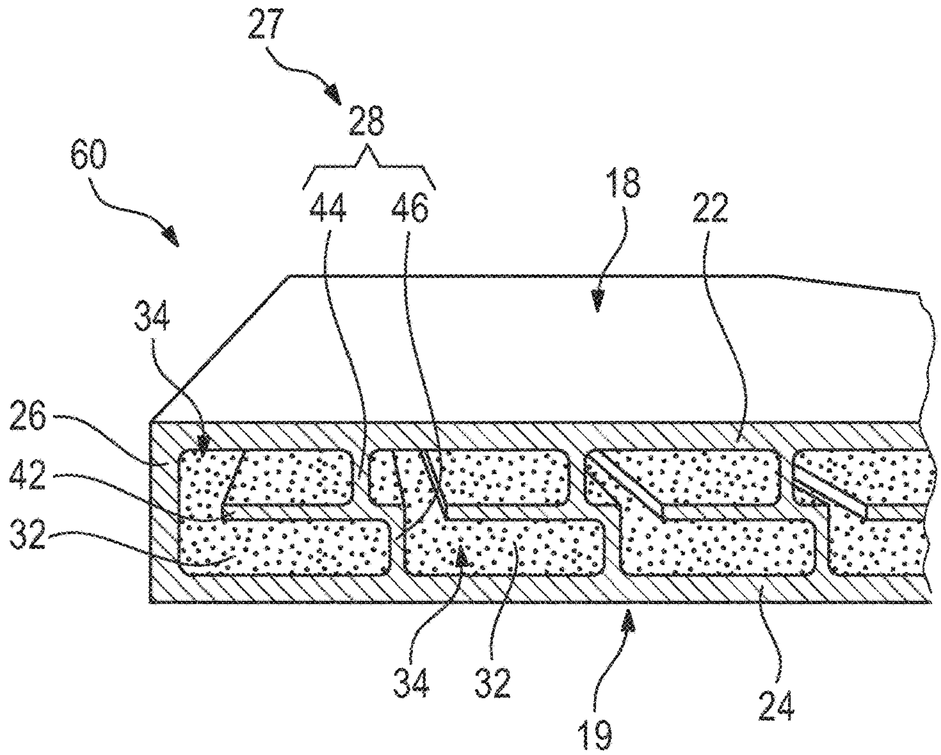
FIG. 5 shows a brake lining rear plate according to the disclosure in a sectional view in accordance with yet another embodiment in a perspective view, which brake lining rear plate has been produced via a method according to the disclosure.

FIG. 5 shows an edge portion of a brake lining rear plate 60 according to the disclosure in accordance with yet a further embodiment, this embodiment being similar to the embodiment according to FIG. 4. In contrast thereto, the transverse webs 42 extend mainly in in each case only one damping cavity 32.

Moreover, the second portion 46 of the longitudinal web 27 acts at one end of the transverse web 42, the first portion 44 acting on the opposite side of the transverse web 42, directly next to the second portion 46. This structural measure results in a large lever arm, as a result of which a free end of the transverse web 42 carries out a relatively large movement.

For example, the longitudinal webs 27 and transverse webs 42 can thus be designed for a desired frequency band to be protected and/or for the amplitude to be expected of the vibrations.

Figure 6:
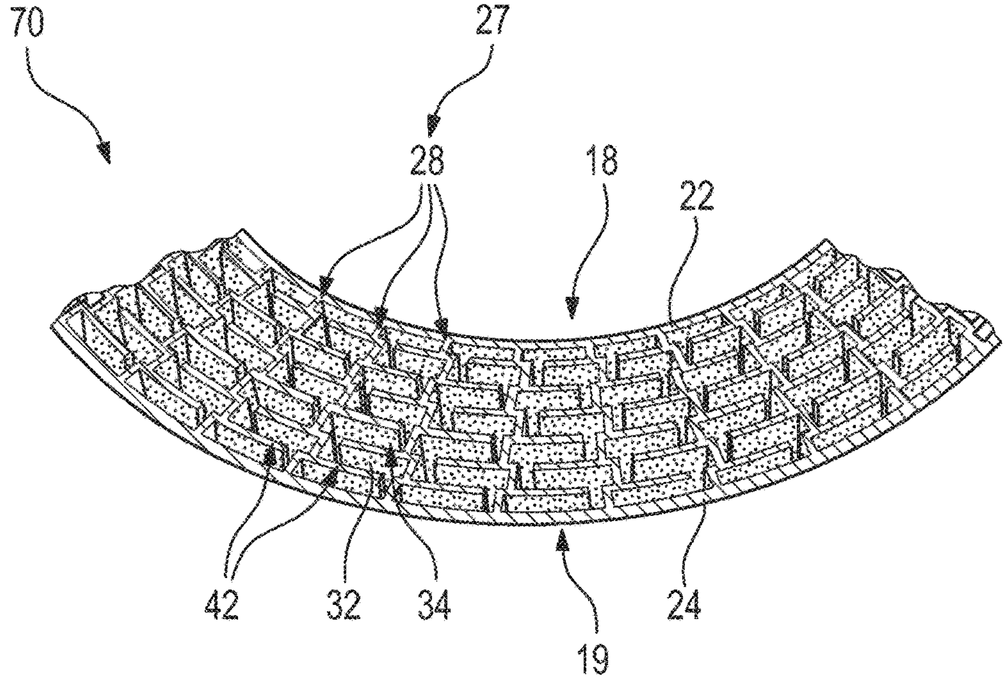
FIG. 6 shows a brake lining rear plate according to the disclosure in a sectional view in accordance with a further embodiment in a perspective view, which brake lining rear plate has been produced via a method according to the disclosure; and, FIGS. 7 and 8 show detailed views of longitudinal webs and transverse webs of brake lining rear plates according to the disclosure in accordance with further embodiments.

FIG. 6 shows an edge portion of a brake lining rear plate 70 according to the disclosure in accordance with a further embodiment, this being highly similar to the embodiment according to FIG. 5. In contrast thereto, there are now a plurality of transverse webs 42 on each longitudinal web 27.

As above, a first and second portion 44, 46 of a longitudinal web 27 leads away from each transverse web 42, the second portion 46 of each transverse web 42 being the first portion 44 of an adjacent transverse web 42. This results in a plurality of parallel transverse webs 42 being arranged in a row behind one another.

Only the respectively last transverse webs 42 before the outer walls 22, 24 form an exception to this described arrangement, the respectively associated first portion 44 and the respectively associated second portion 46 merging here into the first outer wall 22 and into the second outer wall 24, respectively.

Figure 8:
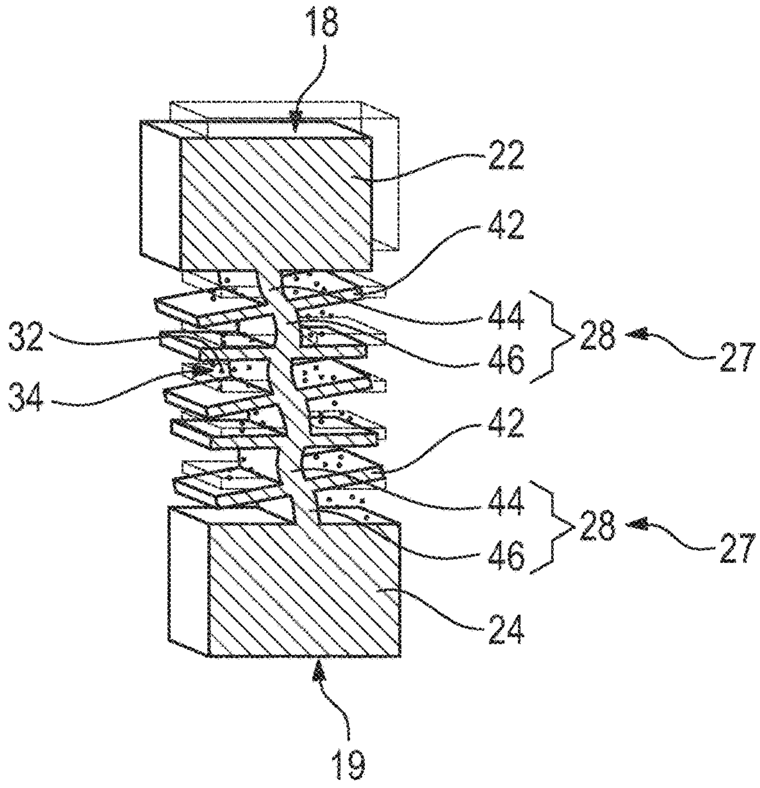

In a similar manner to FIG. 7, FIG. 8 shows the behavior of a part detail of a brake lining rear plate 80 in accordance with a further embodiment under the action of force. Here, the brake lining rear plate 80 is highly similar to the brake lining rear plate 70 according to FIG. 6.

The brake lining rear plate 80 has a longitudinal web 27, and a plurality of transverse webs 42 extending laterally away from the longitudinal web 27. Here, the arrangement of the transverse webs 42 on the longitudinal web 27 corresponds to the above-described arrangement according to FIG. 6.

The brake lining rear plate 80 is to be seen in a somewhat compressed state here, as is to be expected, for example, during a braking operation. In comparison with an uncompressed state, the numerous transverse webs 42 are now somewhat twisted, as a result of which even more movement can be introduced into the damping material 34. As a result, the number of random collisions of the damping material 34 can be increased, as a result of which the vibrations which are introduced as a consequence of the braking operation are reduced efficiently.

The different embodiments of the brake lining rear plate 14, 40, 50, 60, 70, 80 can be produced by way of a method according to the disclosure, which will be described briefly in the following text.

The method provides that the brake lining rear plate 14, 40, 50, 60, 70, 80 is produced by way of a powder pack method, the layer construction taking place from the first outer side 18 in the direction of the second outer side 19. Since very great forces are transmitted by the brake lining rear plate, the direction of the layer construction is decisive for the long service life of the brake lining rear plate 14, 40, 50, 60, 70, 80.

In other words, the layer planes of the constructed layers should be as parallel as possible to the first and second outer side 18, 19 in an optimum way, in order to avoid shear forces between the layers.

As a result of the powder pack method, powder material which is not melted due to the method remains loosely in the damping cavities 32, the powder material acting as the above-described granular damping material 34.

As an alternative, however, it is also conceivable that the brake lining rear plate 14, 40, 50, 60, 70, 80 is produced in a casting method, in the case of which the damping cavities 32 are formed by way of a lost sand core.

The sand core disintegrates after the solidification of the cast brake lining rear plate 14, 40, 50, 60, 70, 80 in the damping cavities 32 which are formed by way of the sand core, and then acts as granular damping material 34.

What is claimed is:

1. A brake lining rear plate for a brake pad of a vehicle disk brake, the brake lining rear plate comprising:

a flat main body which has a first and an opposite second outer side, the first outer side being provided to fasten a brake lining, and the second outer side being provided to face an actuator, a first outer wall which at least partially forms the first outer side and a second outer wall which lies opposite the first outer wall and at least partially forms the second outer side, an outer peripheral wall connecting the two outer walls to one another, at least one damping cavity in the brake lining rear plate, the damping cavity being enclosed by the two outer walls and the outer peripheral wall, a plurality of longitudinal webs which lie inward from the outer peripheral wall, connect the outer walls to one another, and delimit damping cavities from one another, at least one transverse web in at least one damping cavity, the at least one transverse web extending laterally into a damping cavity, in order to form at least two part spaces which are open toward one another, wherein the transverse web emanates from a longitudinal web and extends into an adjacent damping cavity, the longitudinal web being divided by way of the transverse web into two portions which are not congruent in an imaginary extension, and center planes of each portion not being congruent, and wherein the damping cavity is filled at least partially with a granular damping material.

2. A method for producing a brake lining rear plate according to claim 1, wherein the brake lining rear plate is produced by way of an additive manufacturing method, in the case of which a plurality of individual layers are built up on one another, the layer construction taking place from the first outer side in the direction of the second outer side, or vice versa.

3. The method according to claim 2, wherein the manufacturing method is a powder pack method, and a powder material which is required on account of the powder pack method remains loose in at least one damping cavity after the additive layer construction.

4. The brake lining rear plate according to claim 1, wherein the longitudinal webs extend radially in the direction of a common center, the center lines intersecting in the center, or imaginary extensions of the center lines intersecting in the center.

5. The brake lining rear plate according to claim 1, wherein a plurality of damping cavities have different volumes and/or are filled with different damping material.

6. The brake lining rear plate according to claim 1, wherein with the exception of the granular damping material, the brake lining rear plate is configured in one piece and has a layered construction.

7. A brake pad for a vehicle disk brake, with a brake lining and a brake lining rear plate according to claim 1, the brake lining being fastened non-releasably directly to the first outer side of the brake lining rear plate.

8. A brake lining rear plate for a brake pad of a vehicle disk brake, the brake lining rear plate comprising:

a flat main body which has a first and an opposite second outer side, the first outer side being provided to fasten a brake lining, and the second outer side being provided to face an actuator, a first outer wall which at least partially forms the first outer side and a second outer wall which lies opposite the first outer wall and at least partially forms the second outer side, an outer peripheral wall connecting the two outer walls to one another, and at least one damping cavity in the brake lining rear plate, the damping cavity being enclosed by the two outer walls and the outer peripheral wall, wherein the damping cavity is filled at least partially with a granular damping material, and wherein, with the exception of the granular damping material, the brake lining rear plate is configured in one piece and has a layered construction.

9. The brake lining rear plate according to claim 8, further comprising a plurality of longitudinal webs which lie inward from the outer peripheral wall, connect the outer walls to one another, and delimit damping cavities from one another.

10. The brake lining rear plate according to claim 9, wherein the longitudinal webs extend radially in the direction of a common center, the center lines intersecting in the center, or imaginary extensions of the center lines intersecting in the center.

11. The brake lining rear plate according to claim 8, further comprising at least one transverse web in at least one damping cavity, the at least one transverse web extending laterally into a damping cavity, in order to form at least two part spaces which are open toward one another.

12. The brake lining rear plate according to claim 11, wherein the transverse web emanates from a longitudinal web and extends into an adjacent damping cavity, the longitudinal web being divided by way of the transverse web into two portions which are not congruent in an imaginary extension, and center planes of each portion not being congruent.

13. A method for producing a brake lining rear plate according to claim 8, wherein the brake lining rear plate is produced by way of an additive manufacturing method, in the case of which a plurality of individual layers are built up on one another, the layer construction taking place from the first outer side in the direction of the second outer side, or vice versa.

14. The method according to claim 13, wherein the manufacturing method is a powder pack method, and a powder material which is required on account of the powder pack method remains loose in at least one damping cavity after the additive layer construction.

15. The brake lining rear plate according to claim 8, wherein a plurality of damping cavities have different volumes and/or are filled with different damping material.

16. A brake pad for a vehicle disk brake, with a brake lining and a brake lining rear plate according to claim 8, the brake lining being fastened non-releasably directly to the first outer side of the brake lining rear plate.

* * * * *